US012793312B2

(12) United States Patent
Han et al.

(10) Patent No.: US 12,793,312 B2
(45) Date of Patent: Nov. 10, 2026

(54) METHOD FOR DETERMINING POSE OF NEW AVATAR THAT HAS ENTERED VIRTUAL SPACE WITHIN METAVERSE PLATFORM, AND AVATAR POSE DETERMINATION APPARATUS PERFORMING SAID METHOD

(71) Applicant: SK TELECOM CO., LTD., Seoul (KR)

(72) Inventors: Jinyong Han, Seoul (KR); Gukchan Lim, Seoul (KR); Shikyun Kim, Seoul (KR); Dongyoub Sinn, Seoul (KR); Seungho Shin, Seoul (KR); Kihong Oh, Seoul (KR); Sangheun Lee, Seoul (KR); Byung Joon Chang, Seoul (KR); Jinsoo Jeon, Seoul (KR); Ikhwan Cho, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 168 days.

(21) Appl. No.: 18/694,488

(22) PCT Filed: Aug. 31, 2022

(86) PCT No.: PCT/KR2022/013051
§ 371 (c)(1),
(2) Date: Mar. 22, 2024

(87) PCT Pub. No.: WO2023/048417
PCT Pub. Date: Mar. 30, 2023

(65) Prior Publication Data

US 2025/0131671 A1 Apr. 24, 2025

(30) Foreign Application Priority Data

Sep. 23, 2021 (KR) ........................ 10-2021-0125797

(51) Int. Cl.
*G06T 13/40* (2011.01)
*G06T 7/70* (2017.01)
*G06T 19/20* (2011.01)

(52) U.S. Cl.
CPC ................ *G06T 13/40* (2013.01); *G06T 7/70* (2017.01); *G06T 19/20* (2013.01); *G06T 2219/2004* (2013.01)

(58) Field of Classification Search
None
See application file for complete search history.

(56) References Cited

U.S. PATENT DOCUMENTS 10,484,328 B2 * 11/2019 Kimura ............... G06F 3/04883
2009/0144638 A1 * 6/2009 Haggar ................. H04L 67/131 715/757

(Continued)

FOREIGN PATENT DOCUMENTS

JP 2009-181457 A 8/2009
JP 2011-39860 A 2/2011

(Continued)

OTHER PUBLICATIONS

"Elements Music & Arts Festival: Frequently Asked Questions", archived at https://web.archive.org/web/20210909010818/https://www.elementsfest.us/faq/ on Sep. 9, 2021. (Year: 2021).*

(Continued)

*Primary Examiner* — Zhengxi Liu
(74) *Attorney, Agent, or Firm* — Hauptman Ham, LLP

(57) ABSTRACT

There is provided a method for determining a pose of a new avatar entering into a virtual space on a metaverse platform, the method comprises collecting activity information of at least one participant avatar entering into the virtual space, determining a core avatar among the at least one participant avatar based on the activity information of the at least one (Continued)

participant avatar, and determining a pose of the new avatar based on a location of the core avatar.

17 Claims, 7 Drawing Sheets

(56) References Cited

U.S. PATENT DOCUMENTS

| | | | | |
|---|---|---|---|---|
| 2013/0111366 | A1 | 5/2013 | Silbey et al. | |
| 2014/0218361 | A1* | 8/2014 | Abe | A63F 13/42 345/424 |
| 2017/0354875 | A1* | 12/2017 | Marks | A63F 13/213 |
| 2019/0333261 | A1* | 10/2019 | Nakashima | G06F 3/011 |
| 2023/0237751 | A1* | 7/2023 | Saijo | G06V 10/761 345/419 |

FOREIGN PATENT DOCUMENTS

| | | | |
|---|---|---|---|
| JP | 2021-40203 | A | 3/2021 |
| KR | 10-0682849 | B1 | 2/2007 |
| KR | 10-2018-0092757 | A | 8/2018 |
| KR | 10-2021-0020197 | A | 2/2021 |
| KR | 10-2021-0101570 | A | 8/2021 |

OTHER PUBLICATIONS

Office Action dated Jan. 21, 2025 for corresponding Japanese Patent Application No. 2024-517542, along with an English translation (5 pages).

International Search Report issued on Dec. 5, 2022, for corresponding International Patent Application No. PCT/KR2022/013051, along with an English translation (4 pages).

Written Opinion issued on Dec. 5, 2022, for corresponding International Patent Application No. PCT/KR2022/013051 (3 pages).

* cited by examiner

METHOD FOR DETERMINING POSE OF NEW AVATAR THAT HAS ENTERED VIRTUAL SPACE WITHIN METAVERSE PLATFORM, AND AVATAR POSE DETERMINATION APPARATUS PERFORMING SAID METHOD

CROSS-REFERENCE TO RELATED APPLICATION

The present application is a national stage filing under 35 U.S.C § 371 of PCT application number PCT/KR2022/013051, filed on Aug. 31, 2022, which is based upon and claims the benefit of priority to Korean Patent Application No. 10-2021-0125797, filed on Sep. 23, 2021, in the Korean Intellectual Property Office. All of the aforementioned applications are hereby incorporated by reference in their entireties.

TECHNICAL FIELD

The present disclosure relates to a method for determining a pose of a new avatar entering into a virtual space within a metaverse platform, and an avatar pose determination apparatus for performing the method.

BACKGROUND

Recently, technologies involving virtual reality, augmented reality, and mixed reality which utilize computer graphics technology have been developed. Virtual reality technology utilizes computers to construct a virtual space that does not exist in the real world, making the virtual space feel like reality. On the other hand, augmented reality and mixed reality technologies involve the addition of computer-generated information to the real world, combining the real and virtual worlds for real-time user interaction.

A typical service that provides users with the augmented or mixed reality technology is Metaverse. The term "Metaverse" is a combination of "meta", representing virtual and transcendent, and "universe", representing a three-dimensional virtual world interconnected with reality.

Generally, users in the real world can engage in various activities within the metaverse using avatars that represent the users. In other words, if a virtual space where multiple people gather, such as a school, company, theater, park, etc., is implemented within a metaverse platform, users can experience the virtual space through their avatars. However, the problem is how to determine the location and direction of each avatar entering into the virtual space.

SUMMARY

The problem to be solved by the present disclosure is to provide a method for determining a pose of a new avatar based on a location of a core avatar among a plurality of participant avatars.

However, the problem to be solved by the present disclosure is not limited to that mentioned above, and other problems to be solved that are not mentioned may be clearly understood by those of ordinary skill in the art to which the present disclosure belongs from the following description.

In accordance with an aspect of the present disclosure, there is provided a method for determining a pose of a new avatar entering into a virtual space on a metaverse platform, the method comprises collecting activity information of at least one participant avatar entering into the virtual space, determining a core avatar among the at least one participant avatar based on the activity information of the at least one participant avatar, and determining a pose of the new avatar based on a location of the core avatar.

The pose may include a location of the new avatar and an orientation of the new avatar. Also, the determining the pose of the new avatar may include determining the location of the new avatar based on the location of the core avatar and determining the orientation of the new avatar to face the core avatar at the determined location of the new avatar.

The determining the location of the new avatar may include dividing a surrounding area of the core avatar into a plurality of cells, searching for empty cells not occupied by the at least one participant avatar among the plurality of cells and positioning the new avatar in a cell located closest to the core avatar among the empty cells.

The activity information may include at least one of utterance information, movement information, and follower information. Also, the determining the core avatar may include assigning a weight to the at least one of the utterance information, the movement information, and the follower information included in the activity information, calculating an activity score of the at least one participant avatar based on the weight and determining the core avatar among the at least one participant avatar based on the activity score.

The assigning the weight to the at least one included in the activity information may include assigning a greatest weight to the follower information in a case where the activity information includes the follower information and the new avatar enters into the virtual space within a preset time since creation of the virtual space.

The assigning the weight to the at least one included in the activity information may include assigning a greatest weight to the utterance information in a case where the activity information includes at least the utterance information and the new avatar enters into the virtual space after a preset time has elapsed since creation of the virtual space.

The assigning the weight to the at least one included in the activity information may include assigning a first weight to the utterance information, a second weight to the follower information and a third weight to the movement information, wherein the first weight and the second weight being greater than the third weight in a case where the activity information includes the utterance information, the movement information, and the follower information.

The activity information may include utterance information. Also, the collecting the activity information of the at least one participant avatar may include collecting, along with voice data generated by utterance of the at least one participant avatar, mouth shape data regarding a shape of a detected mouth that uttered the voice data and when a part of the mouth shape data contains vowel data consecutively more than a preset threshold number of times, excluding the part of the voice data corresponding to the mouth shape data from the utterance information.

The at least one participant avatar may be an avatar that enters into the virtual space simultaneously with the new avatar or is already in the virtual space before the new avatar enters into the virtual space.

In accordance with another aspect of the present disclosure, there is provided an avatar pose determination apparatus for determining a pose of a new avatar entering into a virtual space within a metaverse platform, the apparatus comprising: a transceiver configured to collect activity information of at least one participant avatar entering into the virtual space and a processor configured to determine a core avatar among the at least one participant avatar based on the activity information of the at least one participant avatar, and determine a pose of the new avatar based on a location of the core avatar.

The pose may include a location of the new avatar and an orientation of the new avatar. Also, the processor may be further configured to determine the location of the new avatar based on the location of the core avatar and determine the orientation of the new avatar to face the core avatar at the determined location of the new avatar.

The processor may be further configured to divide a surrounding area of the core avatar into a plurality of cells, search for empty cells not occupied by the at least one participant avatar among the plurality of cells and position the new avatar in a cell located closest to the core avatar among the empty cells.

The activity information may include at least one of utterance information, movement information, and follower information. Also, the processor may be further configured to assign a weight to the at least one of the utterance information, the movement information, and the follower information included in the activity information, calculate an activity score of the at least one participant avatar based on the weight and determine the core avatar among the at least one participant avatar based on the activity score.

The activity information may include at least one of the follower information and the utterance information. Also, the processor may be further configured to assign a greatest weight to the follower information in a case where the new avatar enters into the virtual space within a preset time since creation of the virtual space and assign a greatest weight to the utterance information in a case where the new avatar enters into the virtual space after the preset time has elapsed since creation of the virtual space.

The activity information may include utterance information. Also, the processor may be further configured to collect, along with voice data generated by utterance of the at least one participant avatar, mouth shape data regarding a shape of a detected mouth that uttered the voice data and when a part of the mouth shape data contains vowel data consecutively more than a preset threshold number of times, exclude the part of the voice data corresponding to the mouth shape data from the utterance information.

The at least one participant avatar may be an avatar that enters into the virtual space simultaneously with the new avatar or is already in the virtual space before the new avatar enters into the virtual space.

In accordance with another aspect of the present disclosure, there is provided a non-transitory computer-readable storage medium storing a computer program, wherein the computer-readable storage medium stores instructions that, when executed by a processor, cause the processor to perform a method for determining a pose of a new avatar entering into a virtual space on a metaverse platform, the method comprises collecting activity information of at least one participant avatar entering into the virtual space, determining a core avatar among the at least one participant avatar based on the activity information of the at least one participant avatar, and determining a pose of the new avatar based on a location of the core avatar.

According to an embodiment of the present disclosure, by determining a pose of a new avatar based on a location of a core avatar, it is possible to position the new avatar around the core avatar when the new user enters into a virtual space.

DETAILED DESCRIPTION

Figure 1:
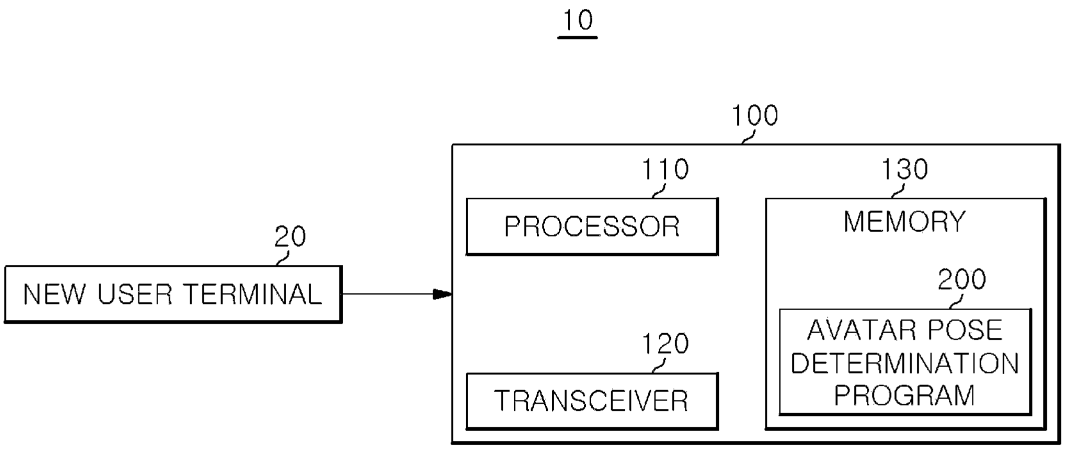
FIG. 1 is a block diagram showing an avatar pose determination system according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a block diagram showing an avatar pose determination system according to an embodiment of the present disclosure.

Referring to FIG. 1, an avatar pose determination system 10 may include a new user terminal 20 and an avatar pose determination apparatus 100.

The new user terminal 20 may enter a virtual space using a metaverse program. The new user terminal 20 may experience the virtual space using its own avatar and communicate with participant terminals (or participant avatars of the participant terminals) that have entered the same virtual space.

In this specification, the virtual space refers not only to the entire virtual space implemented in the metaverse program, but also to any one of a plurality of sub-spaces, and each participant avatar may refer to a new object for which a pose is to be determined among avatars that have entered the same virtual space.

When there is a new user terminal 20 entering into the virtual space, the avatar pose determination apparatus 100 may determine at least one core avatar from among other avatars which have entered the virtual space together with the new user terminal 20 or had previously entered the virtual space, and may determine a pose of an avatar of the new user terminal 20 based on a location of the core avatar.

In some embodiments, the avatar pose determination apparatus 100 may be a server. In other words, the avatar pose determination apparatus 100 may be a server for providing a metaverse platform to the new user terminal 20 or a server for determining a pose of a new avatar of the new user terminal 20 within the metaverse platform.

In this specification, a core avatar may refer to a highly influential avatar among avatars present in a virtual space, such as an influencer avatar or the like. In addition, in this specification, a pose of an avatar may include a location of the avatar and a direction in which the avatar is facing.

To this end, the avatar pose determination apparatus 100 may include a processor 110, a transceiver 120, and a memory 130.

The processor 110 may control the overall operations of the avatar pose determination apparatus 100.

The processor 110 may receive initial information from the new user terminal 20 using the transceiver 120.

The memory 130 may store the avatar pose determination program 200 and information required for execution of the avatar pose determination program 200.

In this specification, the avatar pose determination program 200 may refer to software storing instructions programmed to determine at least one core avatar among participant avatars of participant terminals, which have entered the virtual space with the new avatar of the new user terminal 20 or had previously entered the virtual space before the entry of the new avatar, and to determine a pose of the avatar of the new user terminal 20 based on a location of the at least one core avatar.

In order to execute the avatar pose determination program 200, the processor 110 may load the avatar pose determination program 200 and information required for execution of the avatar pose determination program 200 from the memory 130.

When the new avatar of the new user terminal 20 enters into the virtual space, the processor 110 may execute the avatar pose determination program 200 to determine at least one core avatar from among participant avatars of participant terminals which have entered the virtual space with the new avatar or had previously entered the virtual space before the entry of the new avatar, and may determine a pose of the avatar of the new user terminal 20 based on a location of the at least one core avatar.

The functions and/or operations of the avatar pose determination program 200 will be described in detail with reference to FIG. 2.

In some embodiments, the memory 130 may further store a metaverse program that implements a virtual space. In this case, the avatar pose determination apparatus 100 may execute the metaverse program to implement a virtual space, and may execute the avatar pose determination program to determine a pose of a new avatar entering into the virtual space.

Figure 2:
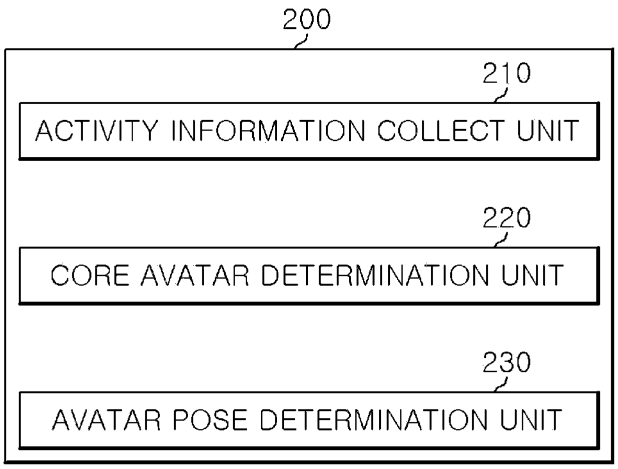
FIG. 2 is a block diagram conceptually illustrating the function of an avatar pose determination program according to an embodiment of the present disclosure.

FIG. 2 is a block diagram conceptually illustrating the function of an avatar pose determination program according to an embodiment of the present disclosure.

Referring to FIGS. 1 and 2, an avatar pose determination program 200 may include an activity information collect unit 210, a core avatar determination unit 220, and an avatar pose determination unit 230.

The activity information collect unit 210, the core avatar determination unit 220, and the avatar pose determination unit 230 shown in FIG. 2 are conceptual divisions of the functions of the avatar pose determination program 200 to facilitate explanation of the functions of the avatar pose determination program 200, but aspects of the present disclosure are not limited thereto. In some embodiments, the functions of the activity information collect unit 210, the core avatar determination unit 220, and the avatar pose determination unit 230 may be merged or separated and may be implemented as a series of instructions included in a single program.

The activity information collect unit 210 may collect activity information of participant avatars which have entered a virtual space with a new avatar, for which a pose is to be determined, or had previously entered the virtual space before the entry of the new avatar.

In some embodiments, the activity information may include utterance information, movement information, and follower information. At this point, the utterance information may include at least one of the time each participant avatar utters and the number of times each participant avatar utters, the movement information may include at least one of a distance each participant avatar travels, the time when each participant avatar travels, and the number of times each participant avatar travels, and the follower information may include the number of followers that follow each individual participant avatar.

Here, the following refers to a cordial intention conveyed by an avatar (or user terminal) toward another avatar, which may include adding a friend (or indicating an intent to add a friend), expressing liking (e.g., Like), etc.

Additionally, in some embodiments, the activity information collect unit 210 may collect activity information of participant avatars periodically or aperiodically. The activity information collect unit 210 may periodically or aperiodically collect utterance information, movement information, and follower information of each participant avatar, and in this case, the periodicity of collecting the utterance information, movement information, and follower information may vary.

Below, how the activity information collect unit 210 collects utterance information, movement information, and follower information of each participant avatar will be discussed. First, the activity information collect unit 210 may generate voice data by removing noise from utterance data generated by utterance of each participant avatar (or each participant terminal's user).

The activity information collect unit 210 may collect utterance information by receiving voice data periodically or aperiodically from each participant terminal and measuring a length of the received voice data, or count the number of received voice data.

In some embodiments, each participant terminal may generate, in addition to voice data, mouth shape data on a detected mouth shape that uttered the voice data. This is because not all voice data may be meaningful. Therefore, if the activity information collect unit 210 receives voice data and mouth shape data and the mouth shape data is vowel data in which a mouth shape corresponding to any one of "ah," "eh," "ih," "oh," and "uh" is detected a preset threshold number of times (e.g., three times) or more consecutively, the voice data corresponding to the vowel data may be excluded from the utterance information.

The activity information collect unit 210 may accumulate utterance information until a corresponding participant avatar leaves the virtual space.

In addition, if a location of a participant avatar changes, the activity information collect unit 210 may generate information on a change in location.

The activity information collect unit 210 may collect movement information by periodically or nonperiodically receiving information on a change in location from each participant terminal and calculate, based on the received information on the change in location, a distance traveled by the corresponding participant avatar, or count the number of times the corresponding participant avatar travels.

The activity information collect unit 210 may accumulate movement information until a participant avatar leaves the virtual space.

Lastly, the activity information collect unit 210 may collect follower information by counting the number of avatars that follow a participant avatar periodically or aperiodically.

The core avatar determination unit 220 may determine at least one core avatar among participant avatars based on activity information of the participant avatars.

More specifically, the core avatar determination unit 220 may assign weights for utterance information, movement information, and follower information included in activity information, calculate an activity score for the participant avatar based on the weights assigned for the utterance information, the movement information, and the follower information, and determine at least one core avatar among the participant avatars based on the calculated activity score.

At this point, the core avatar determination unit 220 may determine a participant avatar with the highest calculated activity score or a predetermined number of participant avatars in descending order of calculated activity score as a core avatar, and may determine a participant avatar with a calculated activity score equal to or greater than a predetermined threshold as a core avatar.

In some embodiments, in the case of determining a pose of a new avatar entering into a virtual space at a time when the virtual space is created, or in the case of determining a pose of a new avatar entering into the virtual space before a preset time (e.g., 5 minutes) has elapsed since the virtual space was created, no or less utterance information or movement information may be accumulated on each of the avatars of the participant terminals due to no or less activity (utterance, movement, etc.) of the participant avatars in the virtual space. Thus, when the virtual space is created and a preset time (e.g., 5 minutes) has not elapsed, the core avatar determination unit 220 may determine a core avatar by assigning a greatest weight to the follower information among the activity information.

Alternatively, in some embodiments, in the case of determining a pose of a new avatar entering into a virtual space after a preset time has elapsed since the virtual space was created, utterance information or movement information may have accumulated on participant avatars which already entered the virtual space before the entry of the new avatar. Therefore, in this case, the core avatar determination unit 220 may assign a greater weight to the utterance information and follower information compared to the movement information, and may assign a greatest weight especially to the utterance information to determine a core avatar.

Meanwhile, in some embodiments, the core avatar determination unit 220 may display which avatar among the participant avatars is determined as a core avatar.

Figure 3:
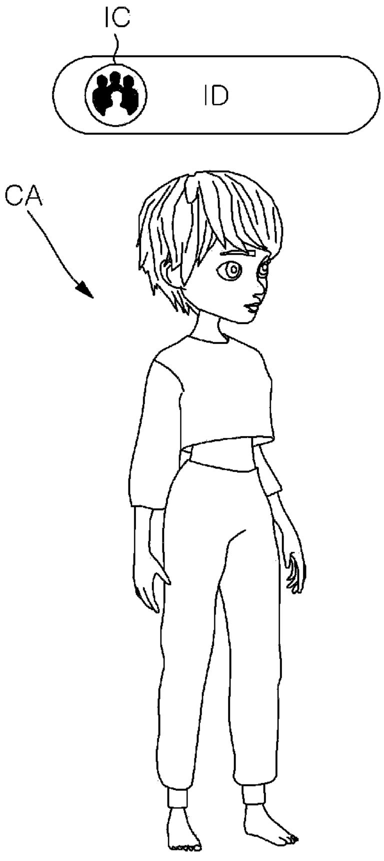
FIG. 3 illustrates an example in which the core avatar determination unit displays an icon representing a core avatar.

For example, FIG. 3 illustrates an example in which the core avatar determination unit 220 displays an icon representing a core avatar on a screen.

Referring further to FIG. 3, the core avatar determination unit 220 may display an icon IC indicating that an avatar CA is a core avatar next to the ID of the avatar CA determined as the core avatar. In doing so, other participant avatars and a new avatar entering into the virtual space may recognize the avatar CA as the core avatar.

The avatar pose determination unit 230 may determine a pose of the new avatar based on a location of the core avatar.

More specifically, the avatar pose determination unit 230 may divide a surrounding area of the core avatar into a plurality of cells, search for empty cells not occupied by any participant avatar among the plurality of cells, and position the new avatar in a cell located closest to the core avatar among the empty cells.

Figure 4:
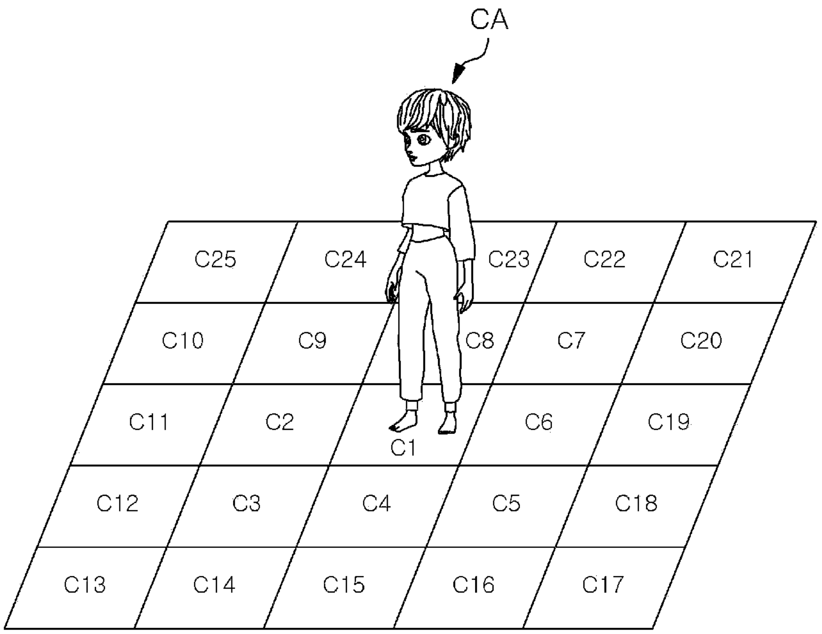
FIG. 4 illustrates an example in which an avatar pose determination unit divides the surrounding area of a core avatar into a plurality of cells.

For example, FIG. 4 illustrates an example in which the avatar pose determination unit 230 divides a surrounding area of a core avatar into a plurality of cells.

Referring further to FIG. 4, the avatar pose determination unit 230 divides the surrounding area of the core avatar into a plurality of cells C1 through C25, and searches for empty cells among the plurality of cells C1 through C25 located closer to the core avatar than the first cell C1 through the ninth cell C9. If, as a result of the search, none of the first cells C1 through C9 is empty, the avatar pose determination unit 230 may search to see if the core avatar has an empty cell in any of the tenth cells C10 through twenty-fifth cells C25 that are located further away than the first cells C1 through C9.

At this point, when there is a plurality of empty cells located closest to the core avatar, the avatar pose determination unit 230 may select one cell from the plurality of closest cells to position the new avatar, either randomly or based on a preset first criterion (e.g., order, direction, etc.).

Figure 5:
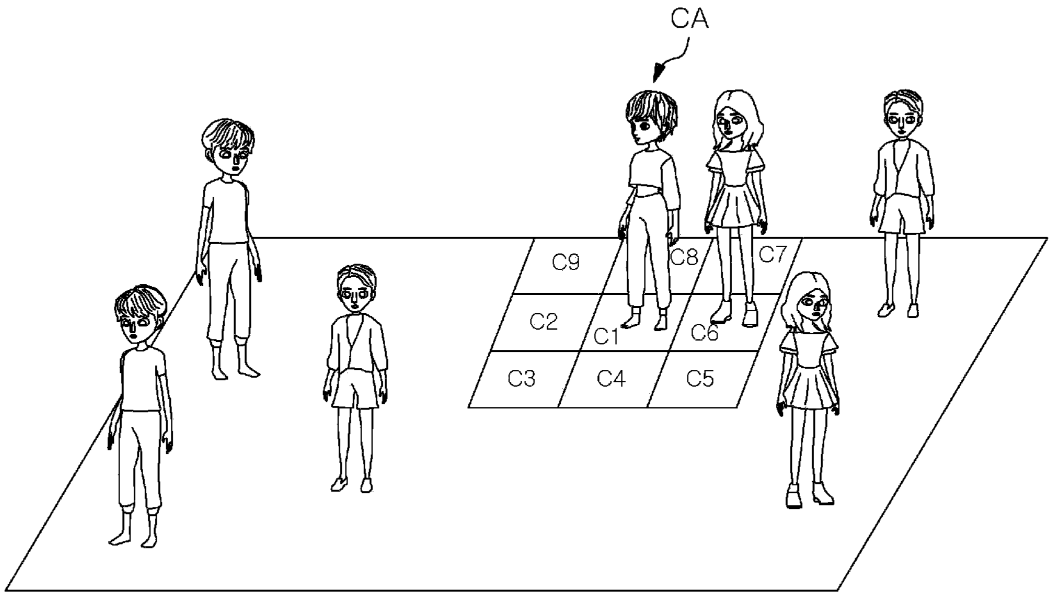
FIG. 5 illustrates an example in which an avatar pose determination unit divides the surrounding area of a core avatar into a plurality of cells.
Figure 6:
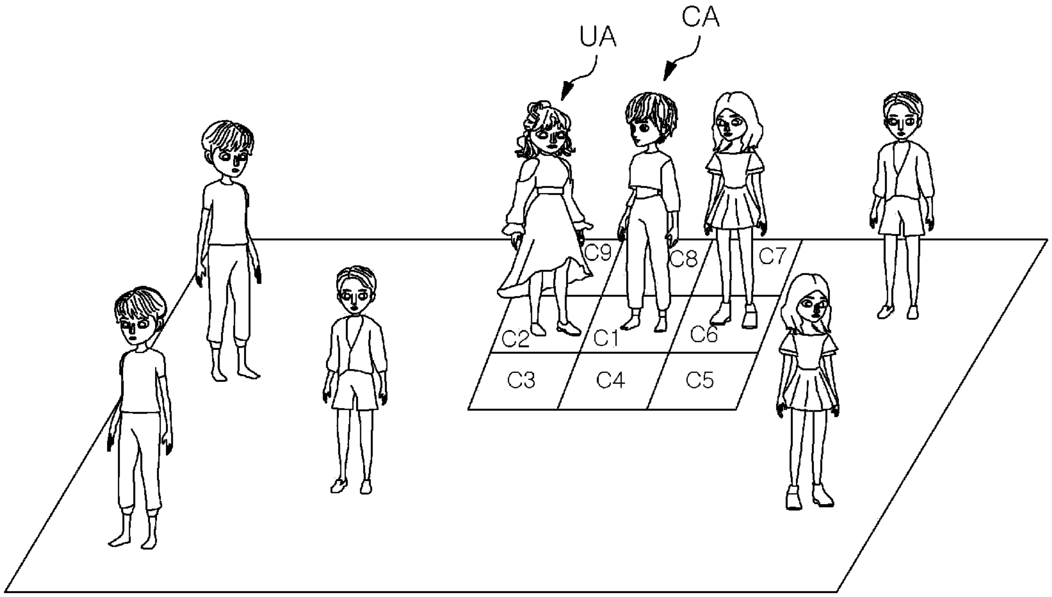
FIG. 6 illustrates an example in which the avatar pose determination unit positions a new avatar in a cell located closest to a core avatar among empty cells.

For example, FIG. 5 illustrates an example in which the avatar pose determination unit 230 divides a surrounding area of a core avatar into a plurality of cells, and FIG. 6 illustrates an example in which the avatar pose determination unit 230 positions a new avatar in a cell located closest to a core avatar among empty cells.

Referring to FIGS. 5 and 6, the avatar pose determination unit 230 may divide a surrounding area of a core avatar CA into a plurality of cells C1, C2, C3, C4, C5, C6, C7, C8, and C9, search for empty cells C2, C3, C4, C5, C7, C8, and C9 not occupied by any avatar among the plurality of cells C1, C2, C3, C4, C5, C6, C7, C1, C2, C3, C4, C5, C6, C7, C8, and C9, and position a new avatar UA in the second cell C2 located closest to the core avatar.

In some embodiments, when determining the poses of a plurality of new avatars entering into a virtual space together, the avatar pose determination unit 230 may, randomly or in the order of entry into the virtual space, position a plurality of new avatars in cells located close to the core avatar.

Alternatively, in some embodiments, when determining the poses of a plurality of new avatars entering into the virtual space simultaneously, the avatar pose determination unit 230 may identify, among the plurality of new avatars, which new avatar has followed (or has been followed by) the core avatar, and may position the new avatar that has followed the core avatar in a cell located closest to the core avatar.

Thereafter, the avatar pose determination unit 230 may determine an orientation of the new avatar to face the core avatar at a location of the new avatar.

In some embodiments, when there are two or more core avatars, the avatar pose determination unit 230 may determine a pose of a new avatar based on activity information of the core avatars.

More specifically, the avatar pose determination unit 230 may determine a final core avatar for the new avatar from among the two or more core avatars based on follower information for each of the two or more core avatars.

For example, the avatar pose determination unit 230 may determine which of the two or more core avatars the new avatar follows as the final core avatar for the new avatar.

If there are two or more core avatars that the new avatar follows, the avatar pose determination unit 230 may determine a final core avatar for the new avatar randomly or by a preset second criterion (e.g., a density of the avatar's surroundings) from among the core avatars that the new avatar follows.

Afterwards, the avatar pose determination unit 230 may divide a surrounding area of the final core avatar into a plurality of cells, search the plurality of cells for an empty cell that is not occupied by any participant avatar, position the new avatar in a cell located closest to the final core avatar among the empty cells, and determine an orientation of the new avatar to face the final core avatar from a location of the new avatar.

Figure 7:
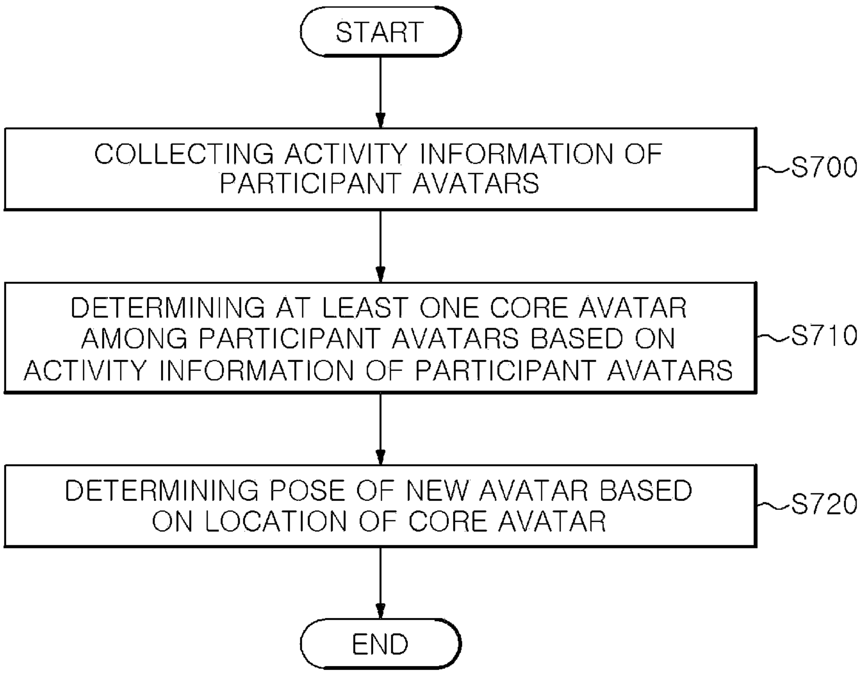
FIG. 7 is a flowchart showing a method for determining a pose of a new avatar by an avatar pose determination program according to an embodiment of the present disclosure.

FIG. 7 is a flowchart showing a method for determining a pose of a new avatar by an avatar pose determination program according to an embodiment of the present disclosure.

Referring to FIGS. 1, 2, and 7, the activity information collect unit 210 may collect activity information of participant avatars which have entered the virtual space with a new avatar, for which a pose is to be determined, or had previously entered the virtual space before the entry of the new avatar (S700).

The core avatar determination unit 220 may determine at least one core avatar among the participant avatars based on the activity information of the participant avatars (S710).

The avatar pose determination unit 230 may determine a pose of the new avatar based on a location of the core avatar (S720).

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for determining a pose of a new avatar entering into a virtual space on a metaverse platform, the method comprising:

collecting activity information of at least one participant avatar entering into the virtual space;

determining a core avatar among the at least one participant avatar based on the activity information of the at least one participant avatar; and determining a pose of the new avatar based on a location of the core avatar, wherein the core avatar is determined at or before entry of the new avatar into the virtual space, wherein the activity information includes at least one of utterance information, movement information, and follower information, and wherein the determining the core avatar includes:

assigning weights to the at least one of the utterance information, the movement information, and the follower information included in the activity information;

calculating an activity score of the at least one participant avatar based on the weights; and determining the core avatar among the at least one participant avatar based on the activity score.

2. The method of claim 1, wherein the pose includes a location of the new avatar and an orientation of the new avatar, wherein the determining the pose of the new avatar includes:

determining the location of the new avatar based on the location of the core avatar; and determining the orientation of the new avatar to face the core avatar at the determined location of the new avatar.

3. The method of claim 2, wherein the determining the location of the new avatar includes:

dividing a surrounding area of the core avatar into a plurality of cells;

searching for empty cells not occupied by the at least one participant avatar among the plurality of cells; and positioning the new avatar in a cell located closest to the core avatar among the empty cells.

4. The method of claim 1, wherein the assigning the weights to the at least one included in the activity information includes assigning a greatest weight of the weights to the follower information when the activity information includes the follower information and the new avatar enters into the virtual space within a preset time since creation of the virtual space.

5. The method of claim 1, wherein the assigning the weights to the at least one included in the activity information includes assigning a greatest weight of the weights to the utterance information when the activity information includes at least the utterance information and the new avatar enters into the virtual space after a preset time has elapsed since creation of the virtual space.

6. The method of claim 1, wherein the assigning the weights to the at least one included in the activity information includes assigning a first weight to the utterance information, a second weight to the follower information and a third weight to the movement information, wherein the first weight and the second weight is greater than the third weight when the activity information includes the utterance information, the movement information, and the follower information.

7. The method of claim 1, wherein the activity information includes the utterance information, and wherein the collecting the activity information of the at least one participant avatar includes:

collecting, along with voice data generated by utterance of the at least one participant avatar, mouth shape data regarding a shape of a detected mouth that uttered the voice data; and excluding, when a part of the mouth shape data contains vowel data consecutively more than a preset threshold number of times, the part of the voice data corresponding to the mouth shape data from the utterance information.

8. The method of claim 1, wherein the at least one participant avatar is an avatar that enters into the virtual space simultaneously with the new avatar or is already in the virtual space before the new avatar enters into the virtual space.

9. An avatar pose determination apparatus for determining a pose of a new avatar entering into a virtual space within a metaverse platform, the apparatus comprising:

a transceiver configured to collect activity information of at least one participant avatar entering into the virtual space; and a processor configured to determine a core avatar among the at least one participant avatar based on the activity information of the at least one participant avatar, and determine a pose of the new avatar based on a location of the core avatar, wherein the core avatar is determined at or before entry of the new avatar into the virtual space, wherein the activity information includes at least one of utterance information, movement information, and follower information, and wherein the processor is further configured to:

assign weights to the at least one of the utterance information, the movement information, and the follower information included in the activity information;

calculate an activity score of the at least one participant avatar based on the weights; and determine the core avatar among the at least one participant avatar based on the activity score.

10. The avatar pose determination apparatus of claim 9, wherein the pose includes a location of the new avatar and an orientation of the new avatar, wherein the processor is further configured to:

determine the location of the new avatar based on the location of the core avatar; and determine the orientation of the new avatar to face the core avatar at the determined location of the new avatar.

11. The avatar pose determination apparatus of claim 10, wherein the processor is further configured to:

divide a surrounding area of the core avatar into a plurality of cells;

search for empty cells not occupied by the at least one participant avatar among the plurality of cells; and position the new avatar in a cell located closest to the core avatar among the empty cells.

12. The avatar pose determination apparatus of claim 9, wherein the activity information includes at least one of the follower information and the utterance information, wherein the processor is further configured to:

assign a greatest weight of the weights to the follower information when the new avatar enters into the virtual space within a preset time since creation of the virtual space; and assign a greatest weight of the weights to the utterance information when the new avatar enters into the virtual space after the preset time has elapsed since creation of the virtual space.

13. The avatar pose determination apparatus of claim 9, wherein the activity information includes the utterance information, and wherein the processor is further configured to:

collect, along with voice data generated by utterance of the at least one participant avatar, mouth shape data regarding a shape of a detected mouth that uttered the voice data; and when a part of the mouth shape data contains vowel data consecutively more than a preset threshold number of times, exclude the part of the voice data corresponding to the mouth shape data from the utterance information.

14. The avatar pose determination apparatus of claim 9, the at least one participant avatar is an avatar that enters into the virtual space simultaneously with the new avatar or is already in the virtual space before the new avatar enters into the virtual space.

15. A non-transitory computer-readable storage medium storing a computer program, wherein the computer-readable storage medium stores instructions that, when executed by a processor, cause the processor to perform a method for determining a pose of a new avatar entering into a virtual space on a metaverse platform, the method comprising:

collecting activity information of at least one participant avatar entering into the virtual space;

determining a core avatar among the at least one participant avatar based on the activity information of the at least one participant avatar; and determining a pose of the new avatar based on a location of the core avatar, wherein the core avatar is determined at or before entry of the new avatar into the virtual space, wherein the activity information includes at least one of utterance information, movement information, and follower information, and wherein the determining the core avatar includes:

assigning weights to the at least one of the utterance information, the movement information, and the follower information included in the activity information;

calculating an activity score of the at least one participant avatar based on the weights; and determining the core avatar among the at least one participant avatar based on the activity score.

16. The non-transitory computer-readable storage medium of claim 15, wherein the pose includes a location of the new avatar and an orientation of the new avatar, wherein the determining the pose of the new avatar includes:

determining the location of the new avatar based on the location of the core avatar; and determining the orientation of the new avatar to face the core avatar at the determined location of the new avatar.

17. The non-transitory computer-readable storage medium of claim 15, wherein the at least one participant avatar is an avatar that enters into the virtual space simultaneously with the new avatar or is already in the virtual space before the new avatar enters into the virtual space.

* * * * *